United States Patent
Lee

(10) Patent No.: US 6,393,279 B1
(45) Date of Patent: May 21, 2002

(54) METHOD FOR SELECTING CELLS IN MULTIBAND SYSTEM

(75) Inventor: Jung-Bong Lee, Yongin-shi (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/382,283

(22) Filed: Aug. 24, 1999

(30) Foreign Application Priority Data

Aug. 24, 1998 (KR) .......................................... 98-34264

(51) Int. Cl.[7] ................................................ H04Q 7/20
(52) U.S. Cl. ...................... 455/426; 455/432; 455/436; 455/552
(58) Field of Search ................................ 455/552, 553, 455/414, 426, 432, 434, 436, 437, 447

(56) References Cited

U.S. PATENT DOCUMENTS

| | | | |
|---|---|---|---|
| 5,483,669 A | * | 1/1996 | Barnett et al. .............. 455/33.2 |
| 5,722,070 A | * | 2/1998 | Alford ......................... 455/425 |
| 6,223,042 B1 | * | 4/2001 | Raffel .......................... 455/455 |
| 6,226,527 B1 | * | 5/2001 | Dalsgaard et al. .......... 455/553 |

* cited by examiner

Primary Examiner—Dwayne Bost
Assistant Examiner—Lewis West
(74) Attorney, Agent, or Firm—Dilworth & Barrese, LLP

(57) ABSTRACT

A multiband system prevents unnecessary cell selecting performed at an overlapped area of two cells using different frequency bands. To this end, the multiband system comprises the steps of detecting RSSIs of the service cell and the neighbor cells and storing the detected RSSIs; determining whether the detected RSSIs satisfy a handoff condition; determining whether a frequency band of the service cell is equal to a frequency band of the neighbor cells, when the handoff condition is satisfied; counting, when the frequency band of the service cell is not equal to the frequency band of the neighbor cells, the number of the neighbor cells having the frequency band being different from the frequency band of the service cell, storing the counted number, comparing the counted number of the neighbor cells with a previously counted number of the neighbor cells, stored in the memory, to determine whether the number of the neighbor cells has increased, and based on the comparison result, determining whether a camping-on condition is satisfied; and camping on the neighbor cell having the different frequency band when the camping-on condition is satisfied, and camping on the present service cell when the camping-on condition is not satisfied.

2 Claims, 3 Drawing Sheets

METHOD FOR SELECTING CELLS IN MULTIBAND SYSTEM

BACKGROUND OF THE INVENTION

1. Field of the Invention

The present invention relates generally to a mobile communication system, and in particular, to a method for selecting cells in multiband system.

2. Description of the Related Art

In general, a European GSM (Global System for Mobile communications) system and a European digital cellular system (DCS) use different frequency bands. That is, the GSM system uses a frequency band of 900MHz and has a GSM cell network, and the DCS system uses a frequency band of 1.9GHz and has a DCS cell network. GSM cells and DCS cells operate independently each other. However, the GSM cell and the DCS cell may exist either independently or overlappedly.

For a pan-European roaming service in which one can be provided with a call service using a GSM phone anywhere in the European Continent, a multiband mobile station is under development, which can provide a call service through the GSM system even in the DCS network. To provide the pan-European mobile communication service, it is necessary to provide a roaming service between the GSM and DCS systems each operating according to different standards. In particular, since the frequency band and cell structure are difference between the two systems, there is required a new cell selecting method performed at an overlapping area of a GSM cell and a DCS cell.

In a single-band system, cell selecting is performed depending on a received signal strength indicator (RSSI). That is, a mobile station detects an RSSI of a service cell (SC) to which the mobile station itself belongs and an RSSI of a neighbor cell (NC) adjacent to the service cell SC, at the boundary of the two cells SC and NC, and selects (i.e., performs a handoff to) the neighbor cell NC when the RSSI of the cell NC is higher than the RSSI of the cell SC. In the single-band system or in the case where the GSM and DCS cells are not overlapped in the multiband system, cell reselecting which depends on the RSSI can be normally performed. However, in the case where the GSM and DCS cells each using different frequency bands are overlapped in the multiband system, cell selecting which depends on the RSSI will have a reduced efficiency. A detailed description of this problem will be made with reference to FIG. 1. FIG. 1 illustrates a cell selecting method in the case where a GSM cell overlaps with a DCS cell.

With reference to FIG. 1, it is assumed that each base station is positioned at the middle of a cell. A mobile station 101 performs communication with a base station in GSM cell 9 at a position 1. In the case where the mobile station 101 travels to position (2), the mobile station 101 is positioned at the overlap area between GSM cell 9 and DCS cell 14. The mobile station selects DCS cell 14 since it is physically closer to the center of DCS cell 14. In the case where the mobile station 101 travels to position 3 into DCS cell 15, the mobile station 101 detects an RSSI transmitted from a base station in DCS cell 15 and an RSSI transmitted from a base station in GSM cell 10 and selects one of the two cells, having the higher RSSI. For the reasons described above, the mobile station 101 selects DCS cell 15 at position 3. However, if the mobile station 101 travels to position 4, the mobile station 101 performs cell reselection even though it has not left the physical boundaries of GSM cell 10, since the mobile station 101 at position 4 is now closer to the center of GSM cell 10 than DSC cell 15. Therefore, each time the mobile station travels to positions 2→3→4→5 starting from the position 1, cell reselecting occurs.

Location registration should be performed at every cell reselecting, causing an increase in load of the base station. In addition, the mobile station should perform unnecessary cell reselecting even in the state where the RSSI is not lower than a threshold, consuming a battery current, which causes a reduction in a battery run-time.

SUMMARY OF THE INVENTION

It is, therefore, an object of the present invention to provide a cell selecting method for a multiband system, which prevents unnecessary cell selecting performed at an overlapped area of two cells using different frequency bands.

To achieve the above object, there is provided a cell selecting method for a mobile station in a multiband system using a plurality of frequency bands. The multiband system has independent cell networks for the respective frequency bands, and a memory for storing the number of neighbor cells having a frequency band being different from a frequency band of a service cell and a minimum received signal strength indicator (RSSI) for cell selecting. The method comprises the steps of: detecting RSSIs of the service cell and the neighbor cells and storing the detected RSSIs; determining whether the detected RSSIs satisfy a handoff condition; determining whether a frequency band of the service cell is equal to a frequency band of the neighbor cells, when the handoff condition is satisfied; counting, when the frequency band of the service cell is not equal to the frequency band of the neighbor cells, the number of the neighbor cells having the frequency band being different from the frequency band of the service cell, storing the counted number, comparing the counted number of the neighbor cells with a previously counted number of the neighbor cells, stored in the memory, to determine whether the number of the neighbor cells has increased, and based on the comparison result, determining whether a camping-on condition is satisfied; and camping on the neighbor cell having the different frequency band when the camping-on condition is satisfied, and camping on the present service cell when the camping-on condition is not satisfied.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 2:
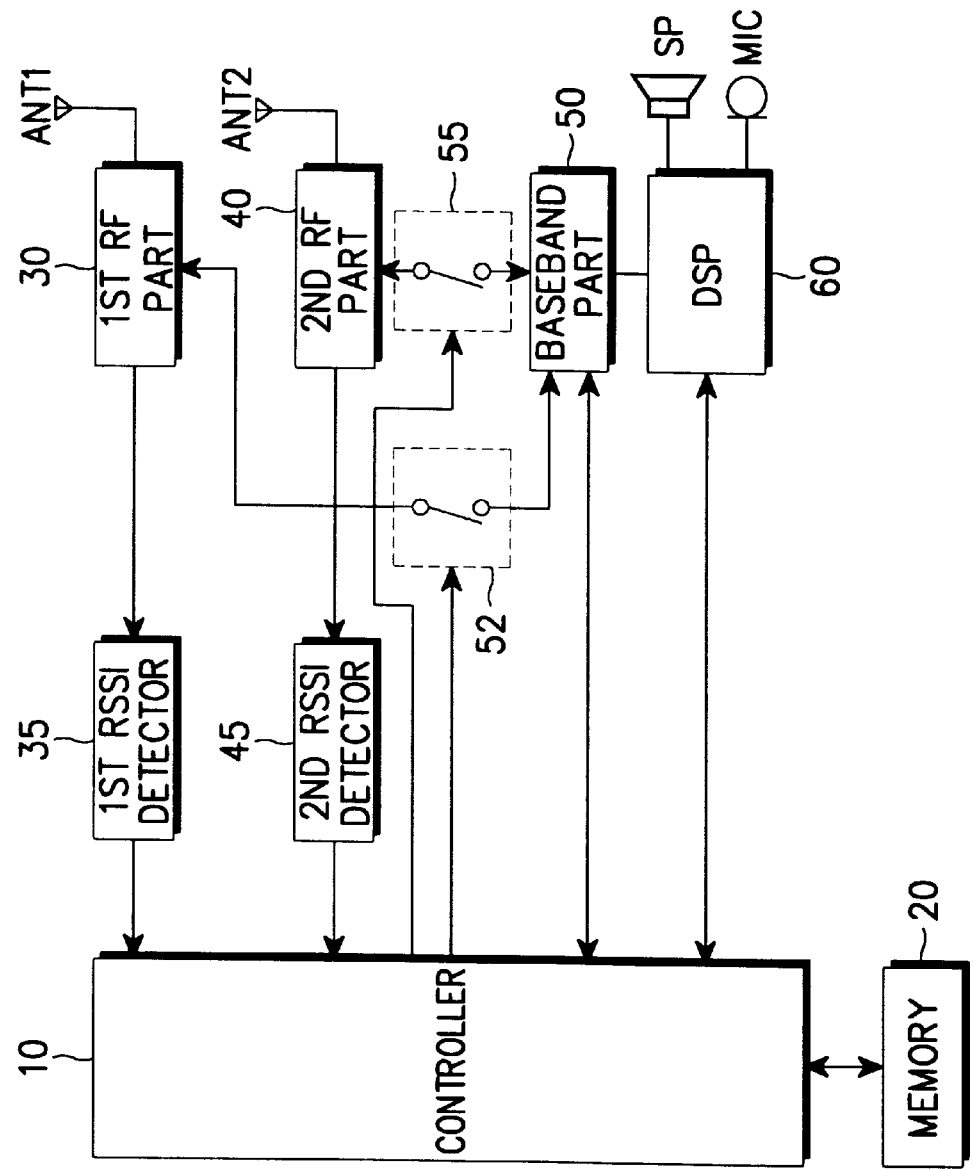
FIG. 2 is a block diagram illustrating a mobile station for a multiband system, to which the present invention is applied.

FIG. 2 illustrates a mobile station for a multiband system, to which the present invention is applied. Referring to FIG.

2, a controller 10 controls the overall operation of the mobile station. A memory 20 is comprised of a ROM (Read Only Memory) for storing an operating program, a RAM (Random Access Memory) for temporarily storing data generated during execution of the operating program, and an EEPROM (Electrically Erasable and Programmable ROM) which stores an RSSI from a service cell SC, an RSSI from a neighbor cell NC, information about PLMN (Public Land Mobile Network) and a minimum RSSI (T_value) for cell reselecting. Further, the EEPROM stores previously detected information about the number of the neighbor cells NCs having a frequency band being different from a frequency band of the cell SC. A first RF (Radio Frequency) part 30 receives an RF signal of the GSM frequency band through a first antenna ANT1 and converts the received RF signal to an intermediate frequency (IF) signal. A first RSSI detector 35 connected to the first RF part 30, detects an RSSI of the GSM RF signal received through the first antenna ANT1. A second RF part 40 receives an RF signal of the DCS frequency band through a second antenna ANT2 and converts the received RF signal to an IF signal. A second RSSI detector 45 connected to the second RF part 40, detects an RSSI of the DCS RF signal received through the second antenna ANT2. A baseband part 50 converts IF signals received from the first and second RF parts 30 and 40 to corresponding digital signals, and converts an input digital signal to an analog IF signal. A first switch 52 connected between the first RF part 30 and the baseband part 50, transfers the IF signal output from the first RF part 30 to the baseband part 50. A second switch 55 connected between the second RF part 40 and the baseband part 50, transfers the IF signal output from the second RF part 40 to the baseband part 50. The first switch 52 and the second switch 55 are switched ON/OFF alternately. That is, when the first switch 52 is switched ON, the second switch 55 is switched OFF; when the first switch 52 is switched OFF, the second switch 55 is switched ON. This is to select one of the two systems each using different frequency bands. A digital signal processor (DSP) 60 processes the digital signal output from the baseband part 50 to provide the processed digital signal to the controller 10, and processes an audio signal output from the baseband part 50 to provide the processed audio signal to a speaker SP. Further, the digital signal processor 60 encodes an audio signal input from a microphone MIC into a digital signal and compresses the converted digital signal together with data input from the controller 10 to transmit the compressed signal and data through a radio channel.

Figure 3:
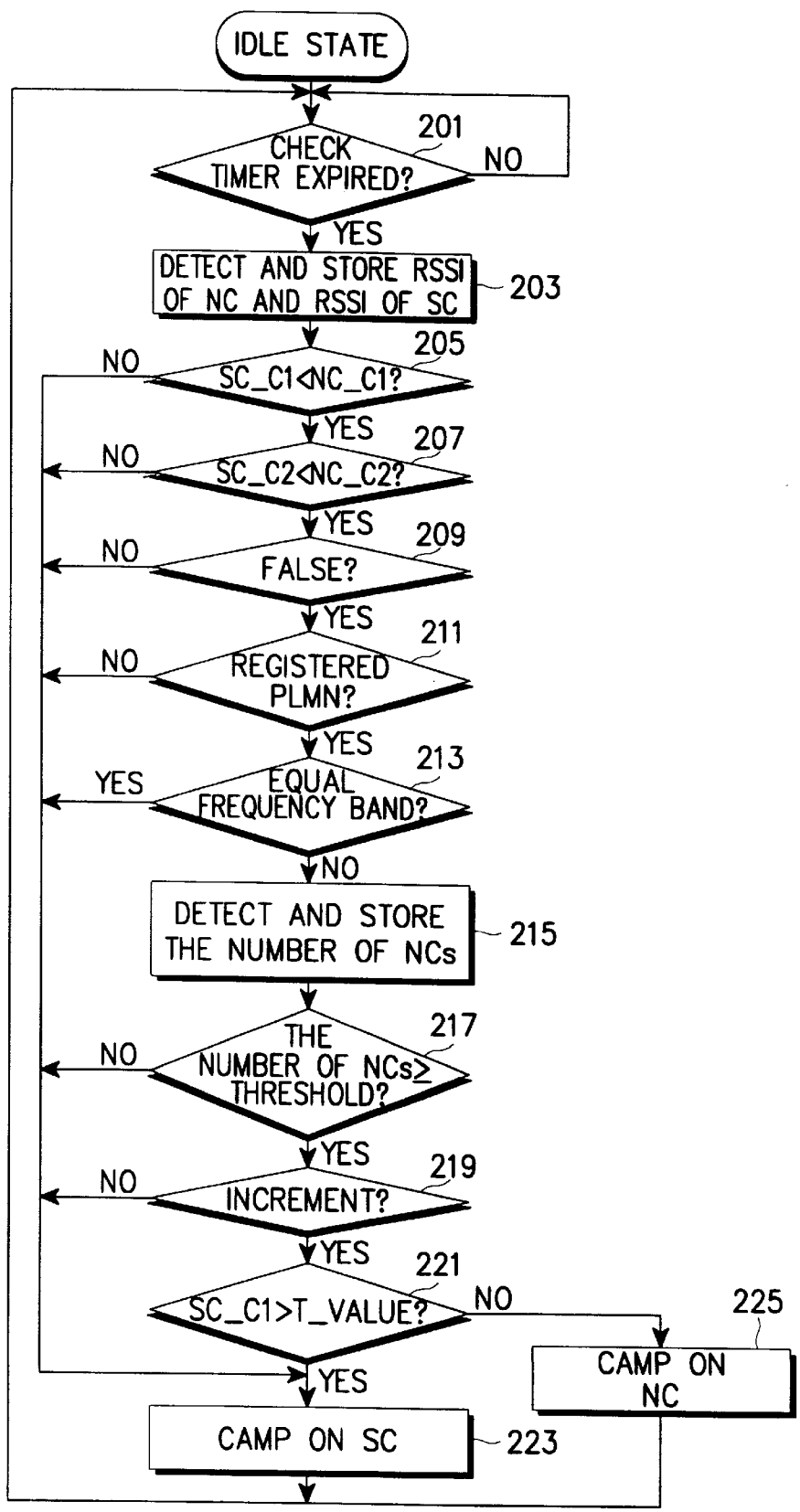
FIG. 3 is a flow chart illustrating a cell selecting method for a multiband system according to an embodiment of the present invention.

FIG. 3 illustrates a cell selecting method in a multiband system according to an embodiment of the present invention. Referring to FIG. 3, upon detection of power-on in step 201, the mobile station controller 10 activates an internal check timer (not shown). The controller 10 periodically detects an RSSI of a service cell SC and an RSSI of a neighbor cell NC using the check timer, in step 203. The RSSI is determined depending on both carrier power C and interference power I. That is, the RSSI is determined according to a ratio of the carrier power C to the interference power I. It is generally known that the carrier power C has a greater influence over the RSSI than the interference power I. Thus, a description will now be made on the basis of the carrier power C. After detecting the carrier power SC_C1 of the service cell SC and the carrier power NC_C1 of the neighbor cell NC in step 203, the controller 10 stores the detected power values SC_C1 and NC_C1 in the memory 20. The power values SC_C1 and NC_C1 are used to prepare for cell selecting or cell reselecting. That is, the power values SC_C1 and NC_C1 are not the values for actual handoff and cell selecting. Thereafter, the controller 10 compares SC_C1 with NC_C1 in step 205. As the result of comparison, if SC_C1>NC_C1, the controller 10 determines in step 207 whether SC_C2>NC_C2. However, when SC_C1≧NC_C1, the current service cell selects the cell CS. That is, at this time, cell reselecting is not performed. As used here, cell selecting is referred to as "Camping On" in the context of two communication systems utilizing different frequency bands. Further, SC-C1 and NC-C1 are values for preparing cell selecting, while SC-C2 and NC-C2 are values for actually performing cell selecting.

Here, the values SC_C2 and NC_C2 are the values to which consideration of an offset value is given for actual handoff and cell selecting. That is, the values SC_C2 and NC_C2 are used to prevent a frequent handoff performed at an overlapped area of the cells SC and NC. As the result of the determination step 207, if SC_C2>NC_C2, the controller 10 examines, in step 209, base station information transmitted from the base station from which the values NC_C1 and NC_C2 are detected, to determine whether a cell bar representing an error state of the base station is set to be false. However, when SC_C2≧NC_C2, the controller 10 camps on the cell SC in step 223. When the cell bar is set to be false, it means that the base station is in an error-free state. However, when the cell bar is set to be true, it means that the base station is in an error state. When the cell bar of the cell NC is set to be true, the controller 10 camps on the cell SC in step 223. Otherwise, when the cell bar of the cell NC is set to be false, the controller 10 determines in step 211 whether a PLMN of the cell NC has been registered in the memory 20. In GSM system, it is generally possible to register eight PLMNs in maximum. As the result of the determination step 211, if it is determined that the PNML of the cell NC has not been registered in the memory 20, the controller 10 camps on the cell SC in step 223; otherwise, the controller 10 proceeds to step 213.

Here, if the system is a single-band system, the cell NC can be selected. However, in the multiband system, since cells of the different systems are overlapped, the cells are detected to be different in size from the standpoint of the mobile station, thus causing unnecessary cell reselecting. Therefore, the mobile station judges in step 213 whether a frequency band of the cell SC is equal to a frequency band of the cell NC. As the result of the judgement, if the frequency band of the cell SC is equal to a frequency band of the cell NC, i.e., if it is judged that the mobile station travels to the same GSM or DCS network, the controller 10 selects the cell NC. However, when the frequency band of the cell SC is different from the frequency band of the cell NC, i.e., when the mobile station travels from a GSM cell to a DCS cell or from a DCS cell to a GSM cell, the following situations should be considered.

When the cell areas of different systems are overlapped, there may exist three possible cases. First, the overlapped cells are almost similar in number for both systems. Second, after a cell of one system is disconnected, a cell of another system is connected (as in the case of FIG. 3). Third, cells of one system are scatteredly located among cells of another system. In the first and third cases, it is not necessary to perform cell reselecting from one system to another system, because the cell reselecting cannot contribute to an increase in quality of the call. When communication is disconnected from a cell of one system and connected to a cell of another system as in the second case, it is necessary to determine the number of the neighbor cells NC to judge whether the mobile station travels to a cell area of another system. This procedure is performed in step 213 and its succeeding steps.

In step 213, the controller 10 determines whether a frequency band of the cell SC is equal to a frequency band of the cell NC. If they are equal to each other, the controller 10 proceeds to step 223 to camp on the cell SC. However, when the frequency band of the cell SC is not equal to a frequency band of any one of the plural neighbor cells NCs, the procedure goes to step 215 where the controller 10 detects the number of the neighbor cells NCs having the frequency band being different from that of the cell SC and stores the detected number of the cells NCs in the memory 20. Since the mobile station has separate RSSI detectors for detecting an RSSI of the cell SC and an RSSI of the cell NC, it can detect the number of the cells NCs having the different frequency band. For example, in FIG. 2, when the first RSSI detector 35 detects an RSSI of the cell SC, the second RSSI detector 45 detects an RSSI of the cell NC having the different frequency band. After detecting the number of the cells NCs having the different frequency band, the controller 10 determines in step 217 whether the number of the cells NCs having the different frequency band is equal to or greater than a predetermined number. When the number of the cells NCs having the different frequency band is smaller than the predetermined number, the controller 10 proceeds to step 223 to camp on the cell SC. However, when the number of the cells NCs having the different frequency band is equal to or greater than the predetermined number, the controller 10 compares, in step 219, the previously detected number, stored in the memory 20, of the cells NCs using the different frequency band with the presently detected number of the cells NCs using the different frequency band, to determine whether the number of the cells NCs using the different frequency band has increased. When the number of the cells NCs has not increased, the controller 10 camps on the present cell SC in step 223. Otherwise, when the presently detected number of the cells NCs has increased, the procedure advances to step 221 to judge that the mobile station has completely moved from a cell area of one system to a cell area of another system. That is, this is to prevent unnecessary cell reselecting while a quality of the call provided from the present cell SC remains good.

In step 221, the controller 10 determines whether the detected value SC_C1 is higher than a minimum RSSI (T_value) for a handoff or cell selecting. Even though the number of the cells NCs using the frequency band being different from that of the cell SC has increased, if the RSSI received from the cell SC is high, it is not necessary to camp on the cell NC using the different frequency band. Therefore, when SC_C1>T_value, the mobile station camps on the cell SC in step 223;

otherwise, when SC_C1≧T_value, the mobile station camps on the cell NC in step 225.

Figure 1:
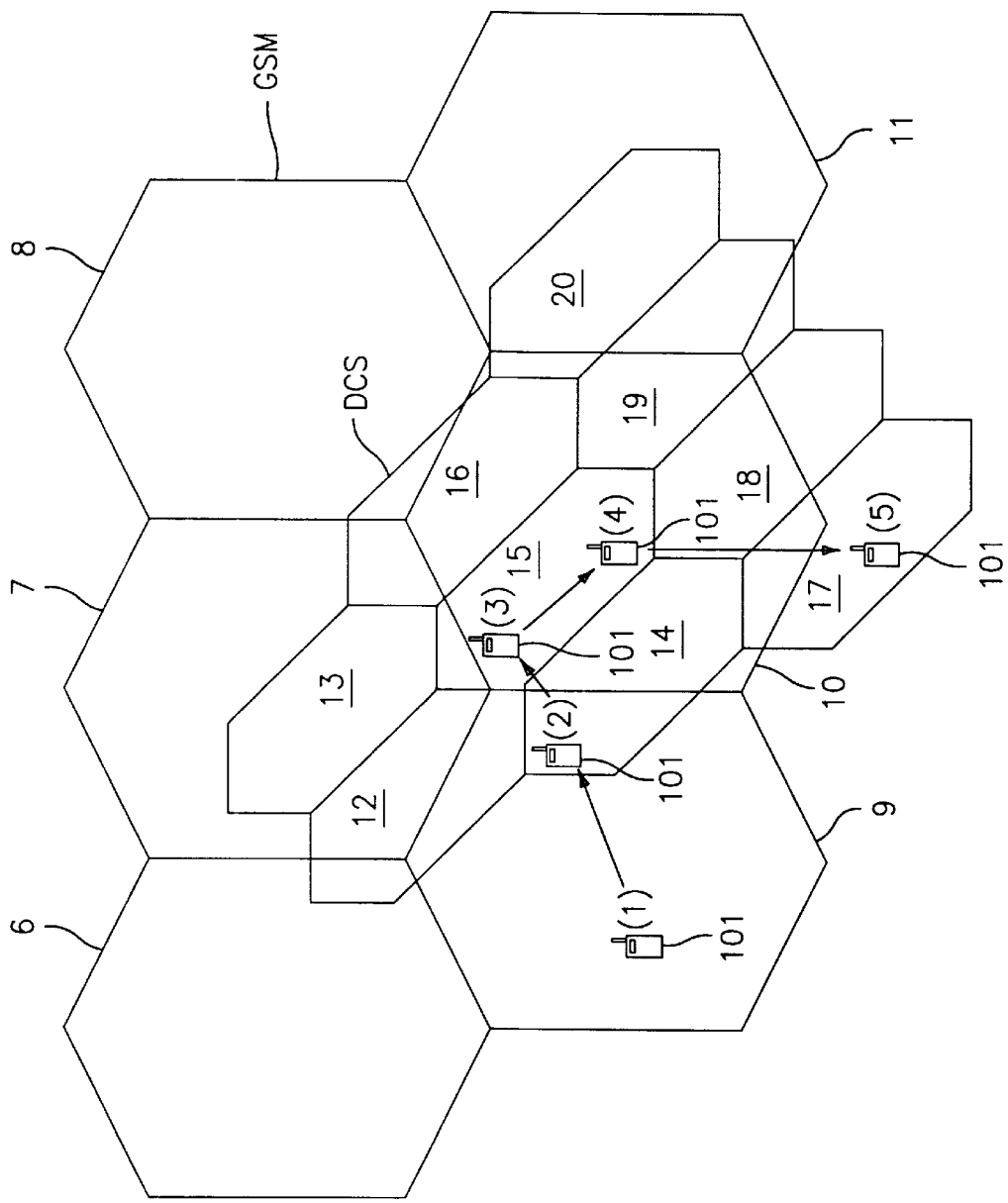
FIG. 1 is a diagram illustrating cell configurations wherein GSM cells overlap with DCS cells.

The above procedure will now be described with reference to FIG. 1. When the mobile station travels from a position 1 to a position 2, the number of the neighbor cells NCs increases but it is smaller than a predetermined number, so that the mobile station maintains connection with the present cell SC. Further, when the mobile station travels from the position 2 to a position 3, the cell SC and the cell NC belong to the same system (i.e., GSM system), so that cell reselecting is normally performed. When the mobile station travels from the position 3 to a position 4, the same operation is performed as in the case where the mobile station travels from the position 1 to the position 2. In addition, when the mobile station travels from the position 4 to a position 5, the same operation is performed as in the case where the mobile station travels from the position 2 to the position 3. In this manner, it is possible to reduce the number of cell reselecting from 4 times to 2 times, when the mobile station travels along the path of positions 1→2→3→4 →5.

As described above, the novel cell selecting method has the following advantages:

(1) It is possible to prevent unnecessary cell reselecting due to overlapping of cells in a multiband system.

(2) A mobile station reduces the number of cell reselecting performed in an idle mode by performing cell reselecting only when necessary, obtaining a result of battery saving.

(3) It is possible to reduce the number of location registration for the mobile station by performing cell reselecting only when necessary, thus suppressing unnecessary communication between the mobile station and a base station. Therefore, the base station will have the reduced load.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A cell selecting method for a mobile station in a multiband system using a plurality of frequency bands, the system having independent cell networks for the respective frequency bands and a memory for storing the number of neighbor cells having a frequency band being different from a frequency band of a service cell and a minimum received signal strength indicator (RSSI) for cell selecting, the method comprising the steps of:

(a) detecting RSSIs of the service cell and the neighbor cells and storing the detected RSSIs;

(b) determining whether the detected RSSIs satisfy a handoff condition;

(c) determining whether a frequency band of the service cell is equal to a frequency band of the neighbor cells, when the handoff condition is satisfied;

(d) counting, when the frequency band of the service cell is not equal to the frequency band of the neighbor cells, the number of the neighbor cells having the frequency band being different from the frequency band of the service cell, storing the counted number, comparing the counted number of the neighbor cells with a previously stored number of the neighbor cells, to determine whether the number of the neighbor cells has increased, and based on the comparison result, determining whether a camping-on condition is satisfied; and (e) camping on the neighbor cell having the different frequency band when the camping-on condition is satisfied, and camping on the present service cell when the camping-on condition is not satisfied.

2. The cell selecting method as claimed in claim 1, wherein step (b) comprises the steps of:

(f) after storing the RSSIs of the service cell and the neighbor cells, comparing the RSSI of the service cell with the RSSI of the neighbor cell to determine whether the RSSI of the neighbor cell is higher than the RSSI of the service cell;

(g) examining whether a cell bar of the neighbor cell is set to false, when the RSSI of the neighbor cell is higher than the RSSI of the service cell; and (h) determining whether the neighbor cell is a registered cell, when the cell bar of the neighbor cell is set to be false.

* * * * *